United States Patent [19]

Holy et al.

[11] Patent Number: 4,936,174
[45] Date of Patent: Jun. 26, 1990

[54] CENTER-DRIVE LATHE

[75] Inventors: Franz Holy, Stockerau; Heinz Mang, Vienna, both of Austria

[73] Assignee: Maschinenfabrik Heid Aktiengesellschaft, Stockerau, Austria

[21] Appl. No.: 323,522

[22] Filed: Mar. 14, 1989

[30] Foreign Application Priority Data

Mar. 14, 1988 [AT] Austria ................... 688/88

[51] Int. Cl.⁵ .................. B23B 3/00; B23B 17/00; B23B 19/00; B23Q 11/08
[52] U.S. Cl. ........................... 82/117; 82/142; 82/149; 29/DIG. 56; 29/DIG. 59; 29/DIG. 60
[58] Field of Search ................ 82/117, 132, 142, 149; 29/DIG. 56, DIG. 59, DIG. 60

[56] References Cited

U.S. PATENT DOCUMENTS

| 2,375,408 | 5/1945 | Gallimore et al. | 82/149 |
| 3,186,267 | 6/1965 | Pabst et al. | 82/149 |
| 3,747,444 | 7/1973 | Schubert | 82/142 |
| 3,922,936 | 12/1975 | Link | 82/142 |
| 4,028,972 | 6/1977 | Morse | 82/142 |
| 4,296,658 | 10/1981 | Champeau et al. | 82/147 |
| 4,506,569 | 3/1985 | Brown et al. | 82/117 |
| 4,545,271 | 10/1985 | Romi | 82/149 |

Primary Examiner—William Terrell
Attorney, Agent, or Firm—Herbert Dubno; Andrew Wilford

[57] ABSTRACT

A center-drive lathe has a longitudinally elongated machine base having a front, a back, and a pair of longitudinally spaced ends. A centerstock is generally centrally mounted on the front of the base and a pair of guides on the front of the base extend longitudinally at least from the centerstock to the ends of the base. Respective carriages are displaceable longitudinally along the guides between the ends and the centerstock so that a workpiece can be spanned in and rotated by the centerstock and worked by tools held on the carriages. A stack of interconnected telescoping plates including one end plate connected to one of the carriages and another end plate connected to the other carriage extends over the guides and past the centerstock between the carriages. The guides are thus covered between the carriages by the telescoping stack of plates.

7 Claims, 3 Drawing Sheets

CENTER-DRIVE LATHE

FIELD OF THE INVENTION

The present invention relates to a lathe. More particularly this invention concerns a center-drive lathe.

BACKGROUND OF THE INVENTION

A standard lathe has a bed at one end of which there is provided a headstock connected to a drive and at the other end there is a tailstock which can be moved longitudinally toward and away from the headstock to accommodate workpieces of different lengths. Such a lathe is used to machine mainly the center regions of a workpiece.

A center-drive lathe has, however, a bed at the center of which is provided a longitudinally nondisplaceable driven headstock or so-called centerstock, with to each longitudinal side a respective carriage provided with a tailstock or so-called endstock that may hold the end of the workpiece or may hold a tool that is used on the rotating workpiece. Both endstock carriages are movable along to the rotation axis, which corresponds to the longitudinal axis of the machine, toward and away from the centerstock. Such a machine is used mainly to machine the ends of a workpiece.

As described in German Pat. No. 3,620,231 such a machine normally has an inclined bed. The endstocks ride on rails underneath the bed and the slot through which the endstocks project must be covered to prevent chips, shavings, and the like from getting into the works of the machine and fouling the guides of the endstocks. To this end a system of stacked telescoping plates is used to each side of the centerstock with the plate at the top or bottom of the stack having an outer edge connected to the centerstock and the opposite end plate having its outer end connected to the respective endstock. Thus as an endstock is moved out it pulls the stack out and expands it, and as it moves in it telescopes the stack together.

In order to be able to work as close as possible to the centerstock it is necessary to make the stack as compact as possible. Thus as described in French Pat. No. 2,557,483 the stack is made of plates that are in fact of shorter longitudinal than transverse dimension. Such a system still places a lower limit equal to the longitudinal dimension of one of the plates on the working spacing. In addition such narrow plates are hard to guide and control so that they frequently cant and jam, and the large number of plates needed means that there are a large number of joints where shavings and the like can get in and jam the system.

OBJECTS OF THE INVENTION

It is therefore an object of the present invention to provide an improved center-drive lathe.

Another object is the provision of such an improved center-drive lathe which overcomes the above-given disadvantages, that is which protects the guides of the endstocks while allowing them to be moved virtually into contact with the centerstock, if desired.

A further object is to provide a center-drive lathe where the guards for the guides of the endstocks are of simple construction and do not jam or leak.

SUMMARY OF THE INVENTION

A center-drive lathe according to this invention has a longitudinally elongated machine base having a front, a back, and a pair of longitudinally spaced ends. A centerstock is generally centrally mounted on the front of the base and a pair of guides on the front of the base extend longitudinally at least from the centerstock to the ends of the base. Respective carriages are displaceable longitudinally along the guides between the ends and the centerstock so that a workpiece can be spanned in and rotated by the centerstock and worked by tools held on the carriages or supported by tailstocks on these carriages. A stack of interconnected telescoping plates including one end plate connected to one of the carriages and another end plate connected to the other carriage extends over the guides and past the centerstock between the carriages. The guides are thus covered between the carriages by the telescoping stack of plates.

Thus with the system of this invention the carriages can be brought right up against the centerstock which is in accordance with the invention cantilevered over the plates between the carriages. In fact the plates each have a longitudinal width equal to that of the centerstock which is sufficient to allow them to be accurately guided and which minimizes sites at which shavings and the like could get through the shield plates to the mechanism and guides inside the base.

According to another feature of this invention the base is formed beneath the guides at the centerstock with a throughgoing front-to-back passage. In addition the lathe has a drive mounted on the back of the base and having a drive train connected through the passage to the centerstock. Thus a workpiece spanned in the centerstock can be rotated by the drive about an axis extending longitudinally of the base and parallel to its front and back. This drive can be a motor having an output shaft parallel to a rotation axis of the centerstock in which case the drive train is a belt drive, or the output shaft can be generally perpendicular to a rotation axis of the centerstock in which case the drive train is a right-angle transmission between the output shaft and the centerstock.

DESCRIPTION OF THE DRAWING

The above and other objects, features, and advantages will become more readily apparent from the following, reference being made to the accompanying drawing in which.

SPECIFIC DESCRIPTION

Figure 1:
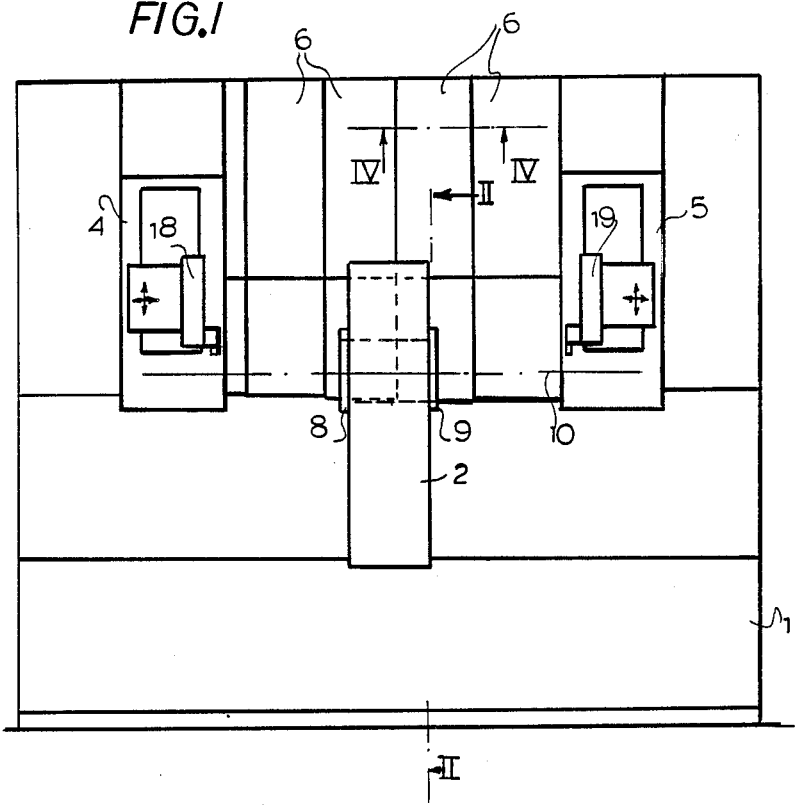
FIG. 1 is a small-scale side view of the lathe according to this invention.
Figure 4:
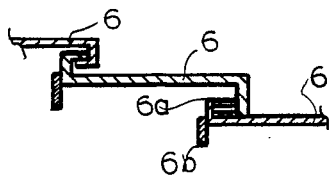
FIG. 4 a large-scale sectional view taken along line IV—IV of FIG. 1.
Figure 2:
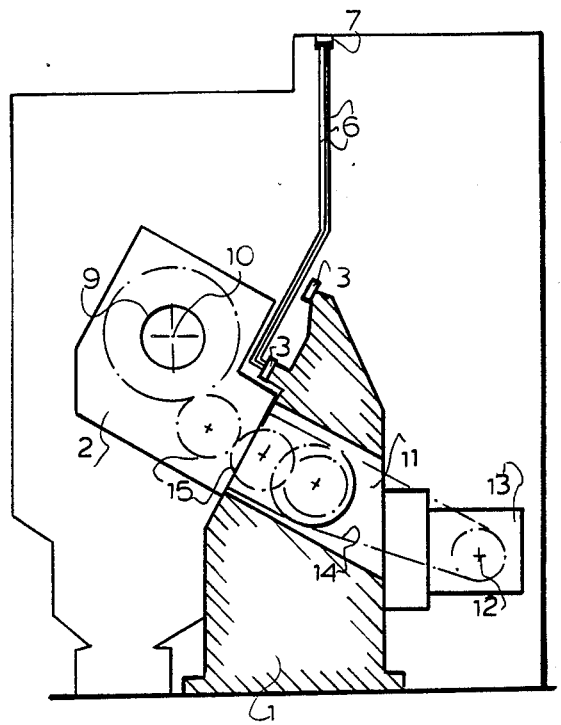
FIG. 2 is a section taken along line II—II of FIG. 1.

As seen in FIGS. 1, 2, and 4, a lathe according to this invention has a base or bed 1 that is provided centrally with a standard head/centerstock 2 and that has guide rails 3 on which are mounted carriages 4 and 5 provided with tools 18 and 19. A workpiece can be held in chucks 8 and 9 on the headstock 2 for rotation about an axis 10 and worked by the tools 18 and 19 in the manner well known per se.

The headstock 2 according to this invention has a cantilevered base so that the guide rails 3 can extend continuously past it in this machine, which is of the inclined bed type. These guides 3 are protected by a single set of telescoping plates 6 one of which has an outer edge attached to the carriage 4 and the other of which has an outer edge attached to the carriage 5. The upper edges of these plates 6 are received in a guide 7 and their side edges, except of course those attached to the carriages 4 and 5, are bent over as shown at 6a in FIG. 4 and are provided with bumpers 6b. Thus as either of the carriages 4 or 5 is pulled out the bent-over edges will engage and will telescope the stack of plates 6 out, and when either carriage 4 or 5 moves in the bumpers 6b will be engaged to push the stack back together.

Since the plates 6 are not coupled to the headstock 2 the carriages 4 and 5 can in fact be moved right up against it, allowing the tools 18 and 19 carried thereby to work right up to the chucks 8 and 9. Thus each plate 6 can have an axial or longitudinal dimension equal to that of the headstock 2. This width is sufficient to provide good guiding for the plates on the guide 7, and also minimizes joints so that shavings and the like are not likely to get into the machine.

As shown in FIG. 2 the chucks 8 and 9 are driven by a motor 13 mounted on the back of the base 1 and having a shaft 12 extending parallel to the axis 10. The base 1 is formed underneath the guides 3 with a throughgoing hole 11 through which a belt drive 14 connected to the shaft 12 extends. Gears 15 then couple this belt drive 14 to the chucks 8 and 9.

Figure 3:
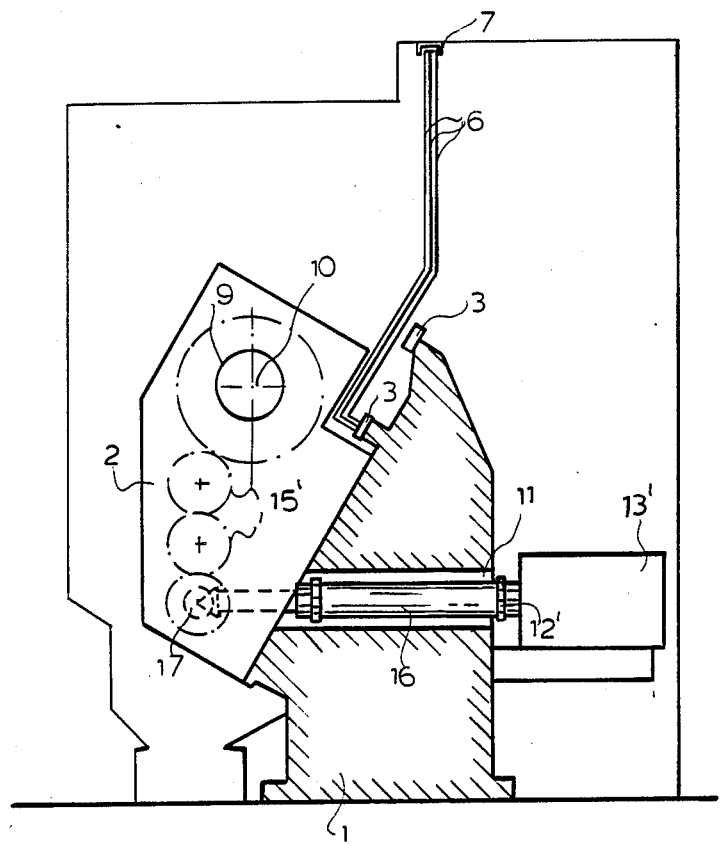
FIG. 3 is a section line FIG. 2 but showing an alternative drive system.

Alternately as seen in FIG. 3 a motor 13' mounted on the back of the base 1 has a shaft 12' extending horizontally in a plane perpendicular to the axis 10 and connected via a right-angle drive 17 and gearing 15' to the chucks 8 and 9. As in FIG. 2, this drive train extends through the hole 11 in the base 1 and is situated relatively low for minimal vibration. This out-of-the way mounting of the drive is extremely convenient and much less dangerous than the standard overhead mounting.

We claim:

1. A center-drive lathe comprising:
  a longitudinally elongated machine base having a front, a back, and a pair of longitudinally spaced ends;
  a centerstock fixed generally centrally on the front of the base;
  a pair of guides on the front of the base extending longitudinally past the centerstock between the ends of the base;
  respective carriages displaceable longitudinally along the guides between the ends and the centerstock, whereby a workpiece can be spanned in and rotated by the centerstock and worked by tools held on the carriages; and
  a stack of interconnected longitudinally telescoping plates including one end plate connected to one of the carriages and another end plate connected to the other carriage and extending over the guides and past the centerstock between the carriages, the guides being covered between the carriages by the telescoping stack of plates.

2. The center-drive lathe defined in claim 1 wherein the centerstock is cantilevered transversely over the plates between the carriages.

3. The center-drive lathe defined in claim 1 wherein the base is formed beneath the guides at the centerstock with a transversely throughgoing front-to-back passage, the lathe further comprising
  a drive mounted on the back of the base and having a drive train connected through the passage to the centerstock whereby a workpiece spanned in the centerstock can be rotated by the drive.

4. The center-drive lathe defined in claim 3 wherein the drive includes a motor having an output shaft parallel to a rotation axis of the centerstock, the drive train including a belt drive.

5. The center-drive lathe defined in claim 3 wherein the drive includes a motor having an output shaft generally perpendicular to a rotation axis of the centerstock, the drive train including a right-angle transmission between the output shaft and the centerstock.

6. The center-drive lathe defined in claim 1 wherein the guides are a pair of horizontally and vertically spaced rails.

7. The center-drive lathe defined in claim 1 wherein the centerstock has a predetermined longitudinal width and the plates each have a longitudinal width equal generally to that of the centerstock.

* * * * *